Sept. 26, 1933.    A. E. RICARD    1,928,544
BEARING MEMBER AND PROCESS FOR MANUFACTURING IT
Filed June 16, 1930

A. E. Ricard
INVENTOR

By: Marks & Clerk
ATTYS.

Patented Sept. 26, 1933

1,928,544

UNITED STATES PATENT OFFICE 1,928,544

BEARING MEMBER AND PROCESS FOR MANUFACTURING IT

Alfred Edouard Ricard, Paris, France

Application June 16, 1930, Serial No. 461,614, and in France May 6, 1930

2 Claims. (Cl. 29—149.5)

The increasing strains to which bearings of modern engines are subject have required improvements in their working conditions. One of the most efficient improvements hitherto attained has been provided by the use of oil film friction. The different theories evolved on the subject of lubrication in connection with oil film are in agreement that every lubricant possesses its own lubricating coefficient, and that it is particularly desirable to lower the friction on stationary surfaces as much as possible, and even more so in the case of bearings than in the case of slides. The surface coefficient is smaller as the surface is smooth, more polished and less rough.

Moreover, both theory and practice show that the maximum load that may be supported by a bearing or a slide is mainly dependent upon the minimum thickness of the corresponding oil-film. It is obvious that the thickness of the oil film, which should be continuous, must be greater than the amount of surface unevenness; moreover, as the lubricating coefficient increases with the thickness of the oil-film, it is very desirable to provide a quite smooth surface, in order to reduce the friction coefficient to a minimum and to increase the bearing power of the bearing bush.

It has been found that copper-lead alloys, containing more than 50% copper and at least 15% lead, whether alloyed or not with one or a plurality of other metals, adapted to modify the mechanical properties of copper, are quite similar to the actual antifriction alloys (such as Babbitt metal with which the bearing bushes are usually lined), although having a high melting point, and not being liable to seize; besides, they wear much less than any other known antifriction alloy, and enjoy a lower friction coefficient.

Metals or metalloids, such as tin, zinc, silicon, nickel, aluminium, manganese, or other usual metals, may be alloyed to copper and lead without materially affecting the antifriction qualities of the alloy, which arise from the fact that any appreciable pressure or difference of temperature causes a migration or exudation of the lead or like exudable substance to the surface, the coefficient or dilatation of lead being about twice that of copper. The exuded substance forms a thin lining having the characteristics of a usual Babbitt lining.

In bearing bushes or slides of alloys of this kind as now used, exudation is not or at least is inefficiently produced, as it can only take place at the points where rubbing friction with the rotating member causes a material rise in the temperature; the bush or the like is thus used under quite bad conditions.

The present invention has chiefly for its object to devise a process of treatment of bearing bushes, slides and the like, made of special antifriction alloys, containing at least 50% copper and 15% lead, having a high melting point and a high Brinell number, which essentially consists in forcing a mandrel of somewhat larger diameter than the diameter of the bore through a bush or the like so as to bring said bush to its final size, while producing a highly polished surface and, at the same time, owing to the pressure thus developed, causing exudation of the lead or other exudable substance; in this way, the bush is ready for immediate use in its final shape and in the best conditions.

In the accompanying drawing, given solely by way of example:

According to this invention, the bush or the like, made of an alloy of the kind referred to, is machined in the usual way, to a size slightly exceeding (by 0,02 to 0,07 millimetres) the final size of the bore. Lapping to the final size is carried out by forcing through the bore a mandrel having the diameter of the final bore. The pressure thus developed causes a self-babbitting effect, that is the effect is the same as if the bush were lined with Babbitt metal, although dispensing with such a delicate operation. Such effect is due to exudation of the exudable metal, such as lead, which forms a thin layer of antifriction metal, under the action of pressure and, possibly, the resulting rise in temperature.

Figure 1:
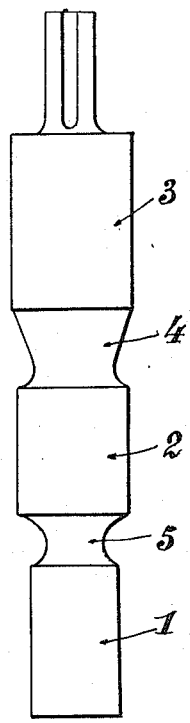
Fig. 1 is an elevation view of a tool for carrying out the process according to the invention.

Fig. 1 shows by way of example a tool for carrying out this process and which consists of three main sections: a cylindrical section 1 to serve as a guide rod having a diameter about 0,2 millimeters less than the final diameter D of the bush bore; a cylindrical reamer 2 with a diameter somewhat less (by about 0,07 millimeters) than D, and a cylindrical mandrel 3 whose diameter equals D and which is fitted with a tapered end 4. Between sections 1 and 2 is a groove 5, to provide an exit for shavings from reamer 2.

The mandrel illustrated on the drawing may be fitted upon any suitable machine, for instance a hydraulic press.

Figure 2:
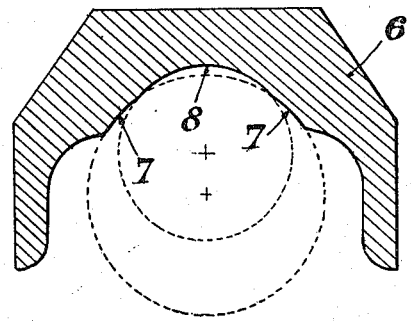
Fig. 2 is a cross section of a carriage axle bush.

Fig. 2 shows, by way of example, a bearing bush 6 as used in railway rolling stock treated in accordance with the invention. Said bearing is bored in the usual manner to a diameter (D+a), D being the diameter of the journal and a a predetermined amount, adapted to provide for a clearance 7 required for the production of the "oil-wedge" which helps to build the oil-film (Mitchell effect).

The bush having the inner diameter (D+a) is brought to its final size D by means of the tool above described, which is forced through the bore of the bearing (comprising a pair of bushes such as 6) thus forming, as above explained, a film of exuded metal upon the surface of the bore 8 of the bush.

I claim:

1. An antifriction bearing bushing of an alloy containing an exudable soft substance wherein the inner surface of the bore is covered with a thin layer of exuded substance obtained by exerting a high pressure throughout said surface before use.

2. A process for the manufacture of bearing members with an alloy containing a number of metals including lead and copper, the proportion of lead being at least 15%, said process consisting in applying upon the bearing surface of said bearing member, after latter has been cooled a relatively high pressure and in forming thus on said bearing surface a very thin consistent layer of lead exudated from said alloy.

ALFRED EDOUARD RICARD.